United States Patent
Horski et al.

[11] Patent Number: 6,111,334
[45] Date of Patent: Aug. 29, 2000

[54] DIVISIBLE LAMINATION BRUSHLESS PUMP-MOTOR HAVING FLUID COOLING SYSTEM

[75] Inventors: Marek Horski; Peter A. Kershaw, both of London, Canada

[73] Assignee: Siemens Canada Limited, Mississauga, Canada

[21] Appl. No.: 09/261,940

[22] Filed: Mar. 3, 1999

Related U.S. Application Data

[62] Division of application No. 09/100,283, Jun. 19, 1998, Pat. No. 5,949,171.

[51] Int. Cl.⁷ .......................... H02K 15/02; H02K 15/10; H02K 3/46
[52] U.S. Cl. .......................... 310/254; 310/42; 242/1.1 R; 29/596
[58] Field of Search .................. 242/433, 1.1 R; 140/92.1, 92.2; 29/596; 310/259, 254, 42

[56] References Cited

U.S. PATENT DOCUMENTS

| | | | |
|---|---|---|---|
| 2,354,551 | 7/1944 | Sawyer | 29/596 |
| 2,512,351 | 6/1950 | Lynn | 310/216 |
| 2,607,816 | 8/1952 | Ryder et al. | 29/596 |
| 2,809,590 | 10/1957 | Brown | 103/87 |
| 2,871,791 | 2/1959 | Litzenberg | 103/87 |
| 2,939,399 | 6/1960 | Rutschi | 103/87 |
| 3,135,211 | 6/1964 | Pezzillo | 310/87 |
| 3,220,349 | 11/1965 | White | 103/87 |
| 3,220,350 | 11/1965 | White | 103/87 |
| 3,288,073 | 11/1966 | Pezzillo | 103/87 |
| 3,826,595 | 7/1974 | Bottoms | 417/370 |
| 3,827,141 | 8/1974 | Hallerback | 310/43 |
| 3,956,651 | 5/1976 | Brammerlo | 310/218 |
| 4,013,384 | 3/1977 | Oikawa | 417/368 |
| 4,015,154 | 3/1977 | Tanaka et al. | 310/42 |
| 4,047,847 | 9/1977 | Oikawa | 417/370 |
| 4,392,072 | 7/1983 | Rosenberry et al. | 310/216 |
| 4,466,182 | 8/1984 | Lamatsch et al. | 310/42 |
| 4,563,606 | 1/1986 | Fukusawa et al. | 310/208 |
| 4,602,423 | 7/1986 | Ulrich et al. | 310/40 R |
| 4,652,218 | 3/1987 | Tsutsui et al. | 417/368 |
| 4,684,329 | 8/1987 | Hashimoto | 417/357 |
| 4,808,087 | 2/1989 | Tsutsui et al. | 417/369 |
| 4,834,624 | 5/1989 | Jensen et al. | 417/370 |
| 4,922,148 | 5/1990 | Kitamura | 310/68 |
| 4,947,065 | 8/1990 | Ward et al. | 310/44 |
| 5,009,578 | 4/1991 | Hyland | 417/365 |
| 5,053,664 | 10/1991 | Kikuta et al. | 310/114 |
| 5,117,128 | 5/1992 | Trian | 310/89 |
| 5,129,795 | 7/1992 | Hyland | 417/423 |

*Primary Examiner*—Nestor Ramirez
*Assistant Examiner*—Burton S. Mullins

[57] ABSTRACT

A brushless pump-motor has a pump housing having an impeller chamber with an impeller in the impeller chamber. A motor assembly is coupled to the pump housing. The motor assembly includes a stator assembly having a plurality of core members. A connecting structure couples the plurality of core members with respect to each other to form a generally annular core assembly such that adjacent core members are disposed in non-contacting relation. Windings are operatively associated with the core members. The stator assembly has an interior portion defining a rotor chamber and a rotor assembly is disposed in the rotor chamber. The connecting structure has a partition portion constructed and arranged to isolate the windings from the rotor chamber. A shaft is provided on which the rotor assembly and impeller are mounted. The shaft includes a hollow portion in open communication with the rotor chamber. Bearing structure is operatively associated with the hollow portion of the shaft for supporting the shaft for rotational movement. An electronic control unit is coupled to the motor assembly and has an upper surface in communication with the rotor chamber. A fluid flow path structure is constructed and arranged to permit fluid (1) to pass from a high pressure portion of the impeller chamber and enter the rotor chamber so that the rotor assembly may be submerged in the fluid, (2) to contact the upper surface of the electronic control unit to cool the electronic control unit, (3) to contact the core members, with the partition portion preventing the fluid from contacting the windings, and (4) to enter the hollow portion of the shaft to cool the bearing structure.

19 Claims, 3 Drawing Sheets

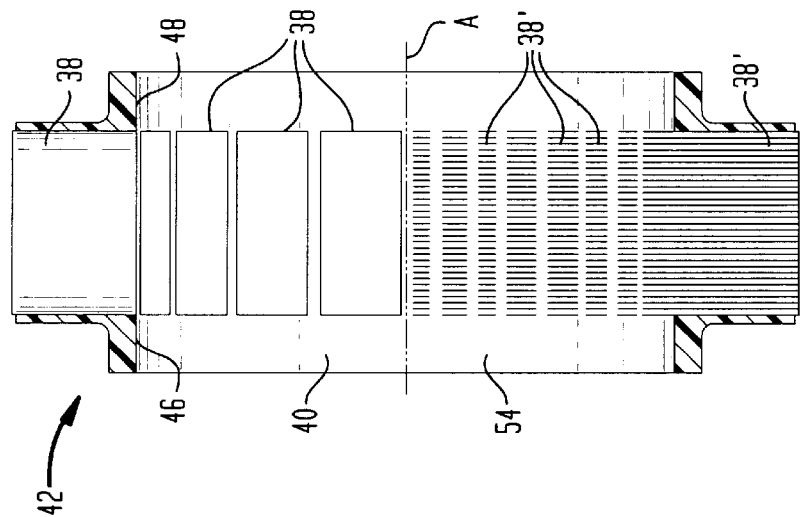
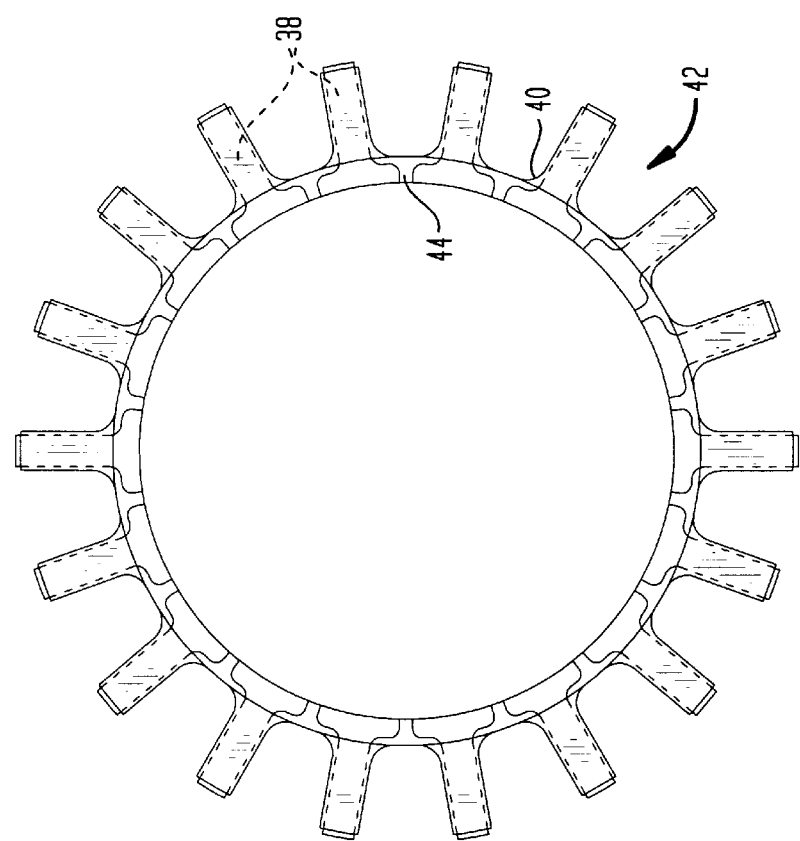
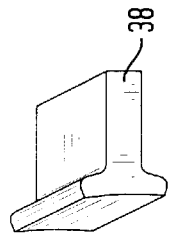

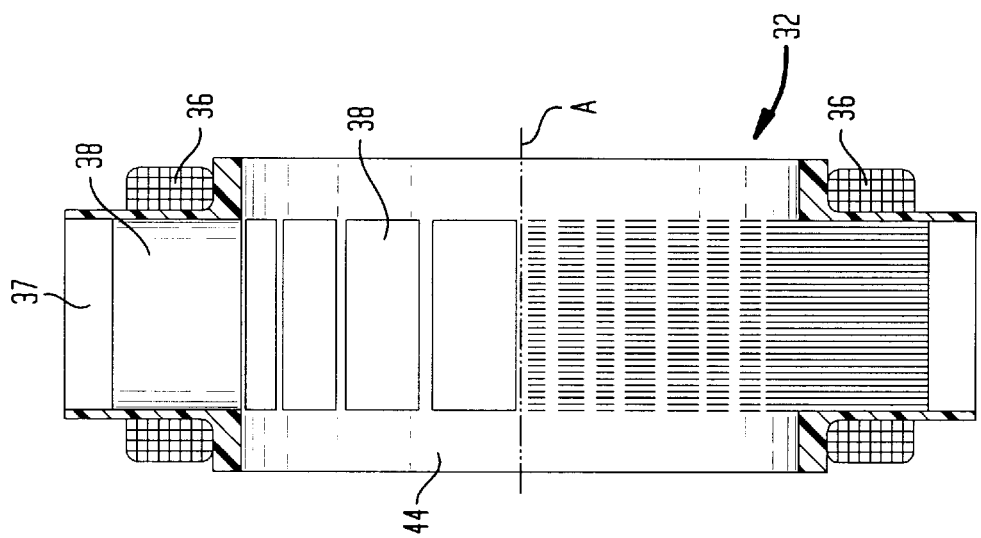
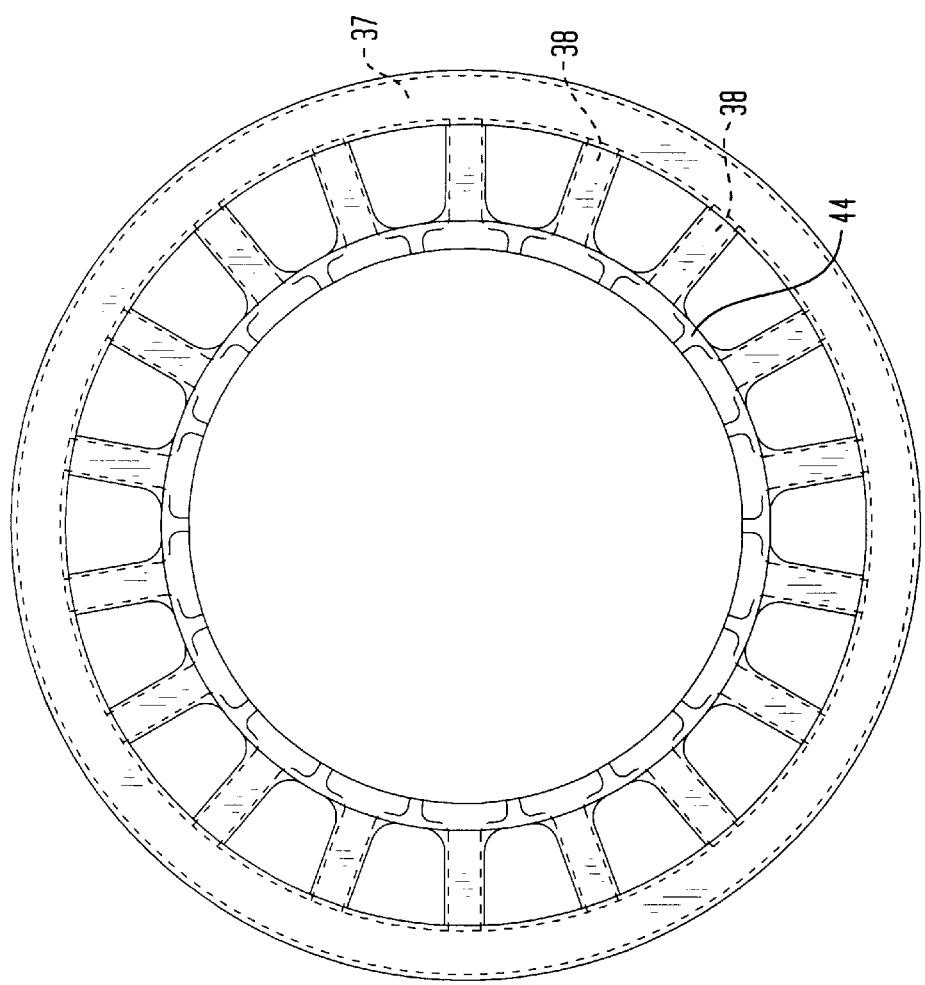

DIVISIBLE LAMINATION BRUSHLESS PUMP-MOTOR HAVING FLUID COOLING SYSTEM

This is a divisional application of application Ser. No. 09/100,283 filed Jun. 19, 1998 now U.S. Pat. No. 5,949,171.

Generally, in pump-motors, the rotor assembly shares a bearing-supported shaft with an impeller of the pump. Water pump-motors generally have some type of cooling to extend the operating capability thereof. It is desirable to maintain the temperature of such devices below a predetermined limit in order to prevent deterioration of the device through thermal breakdown or distortion due to thermal expansion of elements of the device.

Pump-motors having stator assemblies with divided lamination cores are difficult to cool since the cooling fluid should be isolated from the winding set to maintain dry windings. Thus, there is a need to provide an efficient stator assembly having a divided lamination core assembly which is configured to isolate the windings from cooling fluid flowing through the motor.

Further, water pump-motors for use in today's automobiles are electronically controlled and generally have an electronic control unit electrically coupled to the windings of the motor. The electronic control unit generates heat that may limit the operating temperature of the pump-motor. Thus, there is a need to provide cooling not only of the bearings and stator assembly of the device, but also of the electronic control unit thereof.

SUMMARY OF THE INVENTION

An object of the present invention is to fulfill the needs referred to above. In accordance with the principles of the present invention, these objectives are obtained by providing a stator for an electric motor having a plurality of core members. A connecting structure couples the plurality of core members with respect to each other to form a generally annular core assembly such that adjacent core members are disposed in non-contacting relation. Windings are disposed around at least portions of the core members. The connecting structure is generally ring-shaped and is formed by over-molding material onto surfaces of each of the core members.

In accordance with another aspect of the invention a brushless pump-motor is provided having a pump housing including an impeller chamber with an impeller disposed in the impeller chamber. A motor assembly is coupled to the pump housing. The motor assembly includes a stator assembly having a plurality of core members. A connecting structure couples the plurality of core members with respect to each other to form a generally annular core assembly such that adjacent core members are disposed in non-contacting relation. Windings are operatively associated with the core members. The stator assembly has an interior portion defining a rotor chamber and a rotor assembly is disposed in the rotor chamber. The connecting structure has a partition portion constructed and arranged to isolate the windings from the rotor chamber. The motor assembly further includes a shaft on which the rotor assembly and impeller are mounted. The shaft includes a hollow portion in open communication with the rotor chamber. Bearing structure is operatively associated with the hollow portion of the shaft for supporting the shaft for rotational movement. An electronic control unit is coupled to the motor assembly and has an upper surface in communication with the rotor chamber.

The pump-motor further includes fluid flow path structure constructed and arranged to permit fluid (1) to pass from a high pressure portion of the impeller chamber and enter the rotor chamber so that the rotor assembly may be submerged in the fluid, (2) to contact the upper surface of the electronic control unit to cool the electronic control unit, (3) to contact the core members, with the partition portion preventing the fluid from contacting the windings, (4) to enter the hollow portion of the shaft to cool the bearing structure, and (5) return to the low pressure portion of the impeller chamber through the hollow shaft portion.

In accordance with a further aspect of the present invention, a method of providing a stator assembly for an electric motor is disclosed wherein a plurality of individual core members are provided. A connecting structure connects the core members with respect to each other thereby forming a generally annular core assembly such that adjacent core members are disposed in non-contacting relation. An outside-type winding operation is performed to wind wire about the core members.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

FIG. 2 is a perspective view of an individual core member of the stator assembly of the pump-motor of FIG. 1;

FIG. 3 is a plan view of a plurality of core members joined by a connecting structure to form a core assembly in accordance with the principles of the present invention;

FIG. 4 is a cross-sectional view of the core assembly of FIG. 3 wherein solid core members are shown above line A and stacked lamina core members are shown below line A;

FIG. 5 is a plan view of a stator assembly provided in accordance with the principles of the present invention, shown without the windings thereon; and FIG. 6 is a sectional view of a stator assembly provided in accordance with the principles of the preset invention wherein solid core members are shown above line A and stacked lamina core members are shown below line A.

DETAILED DESCRIPTION OF THE PRESENTLY PREFERRED EXEMPLARY EMBODIMENTS

Figure 1:
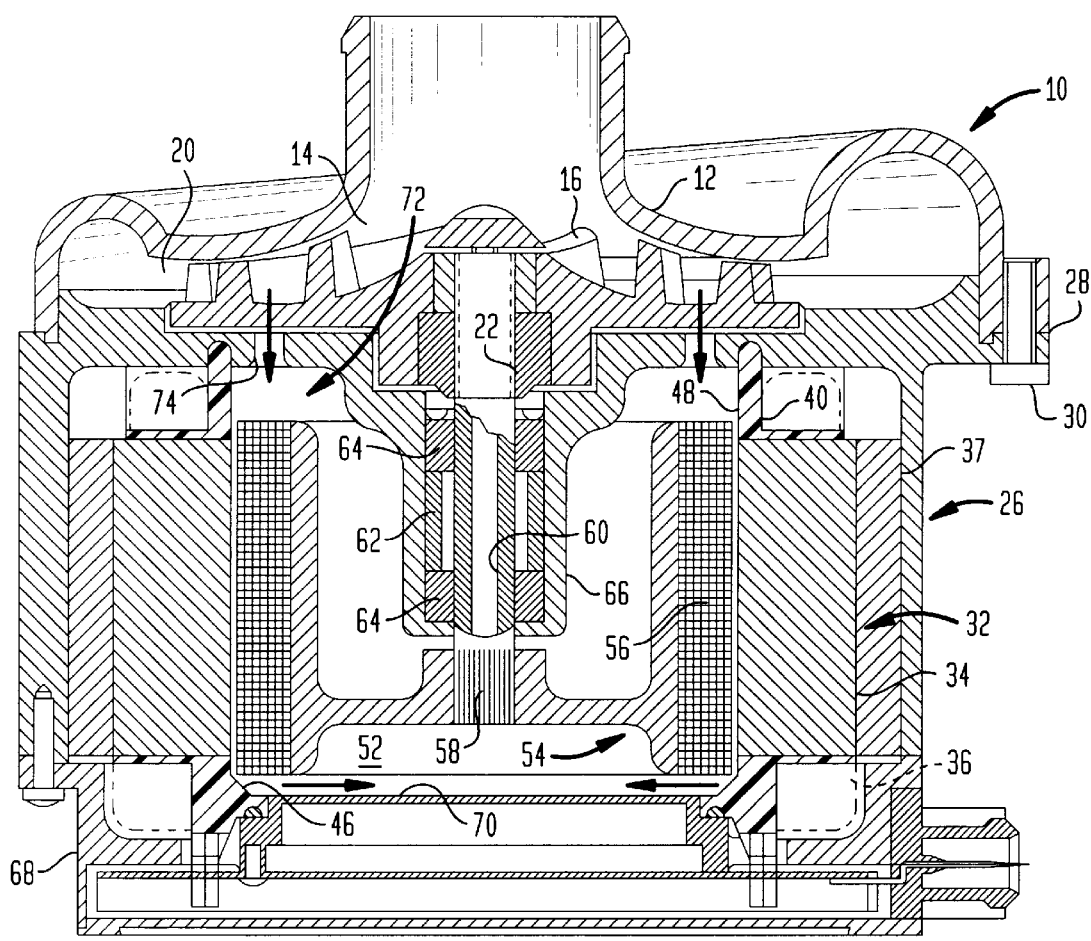
FIG. 1 is a sectional view of a water pump-motor provided in accordance with the principles of the present invention.

Referring to the drawings, a brushless d.c. water pump-motor of the dry winding set type is shown generally indicated at 10 in FIG. 1, which embodies the principles of the present invention. The water pump-motor 10 may be employed in automobiles.

The water pump motor 10 includes a pump housing 12 defining an impeller chamber 14. An impeller 16 is disposed in the impeller chamber 14. The pump housing and impeller may be of any conventional type having an exit at an outer or high pressure portion 20 of the impeller chamber 14, and an inlet at a low pressure portion 22 of the impeller chamber 14.

A motor assembly, generally indicated at 26, is coupled at a first end 28 thereof to the pump housing 12 via bolting 30. The motor assembly 26 includes a stator assembly, generally indicated at 32, having core assembly 34, windings 36 and a flux ring 37.

The stator assembly 32 is of the divisible core type. Thus, with reference to FIGS. 2–4, a plurality of individual core members 38 are provided. The core members 38 may be of the solid type, preferably formed from powdered metal and insulted with silicon as shown in FIG. 2, and as shown above the line A in FIG. 4. Alternatively, the core members 38' may be formed by a plurality of stacked laminas that are joined together, as shown below line A in FIG. 4. Certain surfaces of the core members 38' which will be exposed to cooling fluid may be coated with a fluid resistant material such as a thin plastic film to prevent fluid from penetrating between the individual laminas of the core member 38', as will become apparent below.

As shown in FIGS. 3 and 4, the individual core members 38 are connected via a connecting structure 40 made of insulating material, to form a generally ring-shaped core assembly, generally indicated at 42, with adjacent cores disposed in non-contacting relation. Thus, a gap 44 is provided between adjacent core members 38. This gap 44 reduces magnetic leakage so that the magnetic field may pass to a permanent magnet of the rotor assembly and not leak to adjacent core members 38, as will become apparent below.

The connecting structure 40 is preferably made of any type of plastic material which can maintain its shape in a temperature range of –40 to 140 degrees Celsius. As shown in FIG. 4, the connecting structure 40 is preferably over-molded onto surfaces of the individual core members 38. The connecting structure 40 has opposing partition portions 46 and 48, each being generally in the form of an axially extending annular flange.

It can be appreciated that the stator assembly 32 (FIG. 6) has inside core members gaps 44, but due to the connecting structure 40, and with the absence of flux ring 37, the windings 36 of the stator assembly 32 can be wound with an outside-type winding operation using a conventional armature winding machine. Thus, with reference to FIG. 6, the stator assembly 32 is shown with windings 36 around the core members 38. The windings 36 are wound about the core members 38 with a portion of the connecting structure 40 being disposed between the winding 36 and each core member 38.

To complete the stator assembly 32, a flux ring 37, made of the powdered metal or of the same material as the core members, is disposed about the outer periphery of the core assembly 42.

With reference to FIGS. 1, and 4, the stator assembly 32 has an interior portion defining a rotor chamber 52. A rotor assembly 54, generally indicated at 54, is disposed in the rotor chamber 52. The rotor assembly 54 has the conventional permanent magnets 56 mounted on the outer peripheral portion thereof such that there is a very narrow air gap between the core assemblies 34 and the magnets 56 to increase motor efficiency. As shown in FIG. 1, a shaft 58 is provided on which the rotor assembly 54 and impeller 16 are mounted. The shaft 58 is hollow and thus fluidly communicates the rotor chamber 52 with the impeller chamber 14 via passage 60 therethrough.

The shaft 58 is mounted for rotation via bearing structure, generally indicated at 62, which is operatively associated with the shaft 58 for supporting the shaft for rotational movement. In the illustrated embodiment, the bearing structure 62 includes a pair of bearings 64. As shown in FIG. 1, the bearings 64 are housed in a bearing housing 66 in the form of a boss which is coupled to the impeller housing 12.

An electronic control unit 68 containing the circuitry necessary to operate the water pump-motor 10 is connected electrically to the windings 36 of the stator assembly 32. The electrical connection includes the use of tab pockets which contain the starting and ending wire connection. This electrical connection is disclosed in commonly assigned U.S. patent application Ser. No. 08/961,688, filed Oct. 31, 1997, entitled "Pump Motor Having Fluid Cooling System", the contents of which is hereby incorporated by reference into the present specification. The electronic control unit 68 has an upper surface 70 in communication with the rotor chamber 52. Surface 70 may be part of a heat sink of the electronic control unit 68.

In accordance with an aspect of the invention, fluid flow path structure, generally indicated at 72, is provided to permit cooling fluid to pass from the high pressure portion 20 of the impeller chamber 14 to an inlet 74 of the motor assembly 26 and enter the rotor chamber 52 so that the rotor assembly 54 may be submerged in the cooling fluid. The flow of cooling fluid in the motor assembly 26 is shown by the arrow in FIG. 1.

The cooling fluid contacts the upper surface 70 of the electronic control unit 68 to cool electronic control unit 68. The fluid contacts the core members 38, which have the isolating material thereon as discussed above, to cool the core members 38. The partition portions 46 and 48 of the connecting structure 40 are arranged to provide a seal between the connecting structure 40 and the motor housing and electronic control unit 68 to prevent the cooling fluid from contacting the windings 36. Cooling fluid enters the hollow portion of the shaft 58 to cool the bearing structure 62 and then fluid returns to the low pressure portion 22 of the impeller chamber 14 via passage 60.

Thus, it can be seen that the core assembly bearing structure and the electronic control unit are cooled effectively by the circulating cooling fluid Due to the partition portions of the connecting structure, the cooling fluid in the rotor chamber is isolated from the stator assembly 32 such that the windings 36 thereof may remain dry, out of fluid contact yet may be cooled indirectly from the circulating cooling fluid.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of providing a stator assembly for an electric motor, the method including:

providing a plurality of individual core members, providing a connecting structure composed of magnetic field isolating material to connect said core members with respect to each other and covering at least a portion of opposing surfaces of each of said plurality of core members, thereby forming a generally annular core assembly such that adjacent core member are disposed in non-contacting relation; and performing an outside type winding operation to wind wire about said covered portions of the opposing surfaces of said core members.

2. The method according to claim 1, wherein said step of providing said connecting structure includes over-molding plastics material onto surfaces on said core members.

3. The method according to claim 2, wherein said plastics material maintains an annular shape in a temperature range of −40 to 140 degrees Celsius.

4. The method according to claim 1, further comprising the step of providing a flux ring on an outer peripheral portion of said core assembly after said winding operation.

5. The method according to claim 1, wherein each core member is provided as a solid powdered-metal member.

6. The method according to claim 1, wherein each core member is provided as a plurality of stacked lamina that are joined together.

7. The method according to claim 6, wherein fluid resistant material is provided on certain surfaces of said core members.

8. The method according to claim 1, wherein said connecting structure is over-molded to define opposing, axial extending annular flanges.

9. The method according to claim 8, wherein said wire is wound so as to be adjacent said annular flanges.

10. The method according to claim 8, wherein a flux ring is provided on an outer peripheral portion of said core assembly such that said wound wire is disposed generally between said flanges and said flux ring.

11. A method of providing a stator assembly for an electric motor, the method including:

providing a plurality of individual core members, over-molding plastic material to define connection structure covering at least a portion of opposing surfaces of each of said plurality of core members thereby joining said core members with respect to each other and defining a generally annular core assembly such that adjacent core members are disposed in non-contacting relation, said over-molded plastic connection structure defining flange structure extending axially outwardly from said core members; and performing an outside type winding operation to wind wire about said covered portions of the opposing surfaces of said core members with wire being generally adjacent to said flange structure with said flange structure being arranged to isolate an interior of said core assembly from said wire.

12. A method of providing a stator assembly for an electric motor, the method including:

providing a plurality of individual core members, over-molding plastic material to define connection structure having an annular flange structure and a portion which covers at least a portion of opposing surfaces of each of said plurality of core members thereby joining said core members with respect to each other and defining a generally annular core assembly such said core members extend radially outwardly from said flange structure and said flange structure extends axially outwardly from said core members; and after over-molding said plastic material, performing an outside type winding operation to wind wire about said covered portions of the opposing surfaces of said core members with said flange structure being arranged to isolate an interior of said core assembly from said wire.

13. The method according to claim 12, wherein said core members are disposed in non-contacting relation.

14. The method according to claim 12, wherein said over-molded plastic defines opposing, axially extending flanges, and said outside type winding operation is performed to wind wire about said core members with wire being generally adjacent to said flanges.

15. The method according to claim 12, further comprising the step of providing a flux ring on an outer peripheral portion of said core assembly after said winding operation.

16. The method according to claim 12, wherein each core member is provided as a solid powdered-metal member.

17. The method according to claim 12, wherein each core member is provided as a plurality of stacked lamina that are joined together.

18. The method according to claim 12, wherein fluid resistant material is provided on certain surfaces of said core members.

19. The method according to claim 12, wherein said plastics material maintains an annular shape in a temperature range of −40 to 140 degrees Celsius.

* * * * *